(12) United States Patent
Chung et al.

(10) Patent No.: US 10,514,554 B2
(45) Date of Patent: Dec. 24, 2019

(54) OPTICAL MOTION DETECTING DEVICE FOR A FLIGHT VEHICLE

(71) Applicant: PixArt Imaging Inc., Hsin-Chu (TW)

(72) Inventors: Ching-Lin Chung, Hsin-Chu (TW); Tien-Li Lin, Hsin-Chu (TW); Sai Mun Lee, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 279 days.

(21) Appl. No.: 15/721,751

(22) Filed: Sep. 30, 2017

(65) Prior Publication Data

US 2019/0101770 A1    Apr. 4, 2019

(51) Int. Cl.

| | | |
|---|---|---|
| *G02B 27/64* | (2006.01) | |
| *G01P 3/36* | (2006.01) | |
| *G05D 1/08* | (2006.01) | |
| *G01S 11/12* | (2006.01) | |
| *G01S 5/16* | (2006.01) | |
| *G01P 3/80* | (2006.01) | |

(52) U.S. Cl.
CPC .............. *G02B 27/646* (2013.01); *G01P 3/36* (2013.01); *G01P 3/806* (2013.01); *G01S 5/16* (2013.01); *G01S 11/12* (2013.01); *G05D 1/0858* (2013.01)

(58) Field of Classification Search
CPC ....... G02B 27/646; G02B 27/648; G01P 3/36; G01P 3/806; G05D 1/0858; G01S 11/12; G01S 5/16; G01C 11/00
See application file for complete search history.

(56) References Cited

U.S. PATENT DOCUMENTS

| | | | |
|---|---|---|---|
| 7,365,774 B2* | 4/2008 | Louis | ..................... G01C 11/02 348/219.1 |
| 2013/0223673 A1* | 8/2013 | Davis | ....................... G06K 9/78 382/100 |
| 2017/0374323 A1* | 12/2017 | Gornik | .................. G06T 7/0004 |
| 2019/0226831 A1* | 7/2019 | Li | ............................ G01B 9/02 |

* cited by examiner

*Primary Examiner* — Mary Cheung
(74) *Attorney, Agent, or Firm* — Winston Hsu (57) ABSTRACT

An optical motion detecting device for a flight vehicle includes a base, an optical motion sensor and an operating processor. The optical motion sensor is disposed on the base and adapted to capture a plurality of frames. The operating processor is electrically connected with the optical motion sensor. The operating processor analyzes a pattern within the plurality of frames to acquire displacement of the base relative to a reference plane according to a known height value, and the known height value represents a height that the flight vehicle starts to move.

21 Claims, 5 Drawing Sheets

OPTICAL MOTION DETECTING DEVICE FOR A FLIGHT VEHICLE

BACKGROUND OF THE INVENTION

1. Field of the Invention

The present invention relates to an optical motion detecting device, and more particularly, to an optical motion detecting device applied to a flight vehicle to acquire the level and lift displacement.

2. Description of the Prior Art

A flight vehicle is widespread applied for entertainment recently. The conventional flight vehicle normally utilizes the barometer, the sonar sensor or the time of flight sensor to detect the lifting height. The barometer detects variation of atmospheric pressure, and is difficult to differentiate a tiny height variation. The sonar sensor outputs an audio signal and analyzes the received audio signal, to compute a reflecting transmission path via waveform variation of the received audio signal. The time of flight sensor outputs an optical detecting signal and receives the optical loading signal reflected from an object, time difference between the detecting signal and the reflecting signal is computed to acquire a length of the optical transmission path. The sonar sensor and the time of flight sensor may be easily interfered by environmental audio noise and optical noise. Thus, design of a motion detecting device with accurate detection result for the flight vehicle is an important issue in the related industry.

SUMMARY OF THE INVENTION

The present invention provides an optical motion detecting device applied to a flight vehicle to acquire the level and lift displacement for solving above drawbacks.

According to the claimed invention, an optical motion detecting device for a flight vehicle includes a base, an optical motion sensor and an operating processor. The optical motion sensor is disposed on the base and adapted to capture a plurality of frames. The operating processor is electrically connected with the optical motion sensor. The operating processor analyzes a pattern within the plurality of frames to acquire displacement of the base relative to a reference plane according to a known height value, and the known height value represents a height that the flight vehicle starts to move.

According to the claimed invention, the known height value is detected by an external height sensor of the flight vehicle or assumed via a predetermined takeoff mode of the flight vehicle. An optical axis of the optical motion sensor is slanted to form a fixed angle between the optical axis and a planar normal vector of the reference plane, or the optical axis is parallel to the planar normal vector.

According to the claimed invention, the operating processor transforms a movement of the pattern within the frames into level displacement of the base while the known height value is constant. The operating processor transforms a movement of the pattern within the frames into lift displacement of the base via the fixed angle while the known height value is varied. The operating processor transforms a movement of the pattern within the frames into a hovering angle of the base via the fixed angle while the known height value is constant and the movement is unidirectional. The operating processor transmits a compensating signal to the flight vehicle according to the hovering angle.

According to the claimed invention, the operating processor determines that the base moves across a ramp while the flight vehicle is flown levelly in a constant speed and the known height value and a movement of the pattern within the frames are varied simultaneously. The optical motion sensor is moved relative to the base from a first position to a second position to capture the plurality of frames, a vertical interval between the first position and the second position is represented as the known height value. The pattern is analyzed to acquire the displacement of the base by count computation and/or table lookup.

According to the claimed invention, an optical motion detecting device fora flight vehicle includes a base, a first optical motion sensor, a second optical motion sensor and an operating processor. The first optical motion sensor is fixed on the base and adapted to capture a plurality of first frames. The second optical motion sensor is fixed on the base and adapted to capture a plurality of second frames, and structural parameters of the first optical motion sensor and the second optical motion sensor relative to the base are different from each other. The operating processor is electrically connected with the first optical motion sensor and the second optical motion sensor. The operating processor analyzes patterns within the first frames and the second frames to acquire displacement of the base relative to a reference plane.

According to the claimed invention, the optical motion detecting device further includes a height sensor electrically connected with the operating processor to provide a height value calibrated by the displacement. A first optical axis of the first optical motion sensor is parallel to a planar normal vector of the reference plane, and a second optical axis of the second optical motion sensor is slanted to form a fixed angle between the second optical axis and the planar normal vector.

According to the claimed invention, the operating processor transforms a movement of the pattern within the first frames or the second frames into level displacement of the base while the flight vehicle is flown levelly. The operating processor transforms a movement of the pattern within the second frames into lift displacement of the base via the fixed angle while the flight vehicle is flown vertically. The operating processor transforms a movement of the pattern within the second frames into a hovering angle of the base via the fixed angle while the level displacement is invariable and the movement of the pattern within the second frames is unidirectional. The operating processor transmits a compensating signal to the flight vehicle according to the hovering angle.

According to the claimed invention, the operating processor determines that the base moves across a ramp while movements of the patterns within the first frames and the second frames are varied simultaneously. A vertical interval between the first optical motion sensor and the second optical motion sensor is known as the structural parameters. View angles of the first optical motion sensor and the second optical motion sensor are different and known as the structural parameters.

The optical motion detecting device of the present invention is preferably utilized to aid the external non-optical detection height sensor. The external non-optical detection height sensor is easily interfered by environmental audio/video noise, so the optical motion detecting device is applied for analyzing the movement of the pattern within the captured frame and being able to filter the noise and to acquire the accurate displacement of the flight vehicle. The level and vertical displacement detected by the optical motion detecting device can be compared with the detection result of the external non-optical detection height sensor, so as to determine the fly mode of the flight vehicle for preferred self-adaptation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
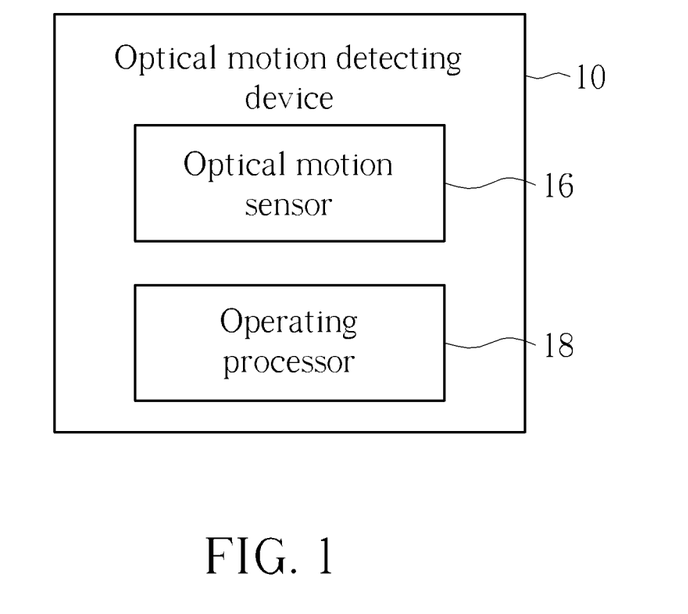
FIG. 1 is a block diagram of an optical motion detecting device according to a first embodiment of the present invention.
Figure 2:
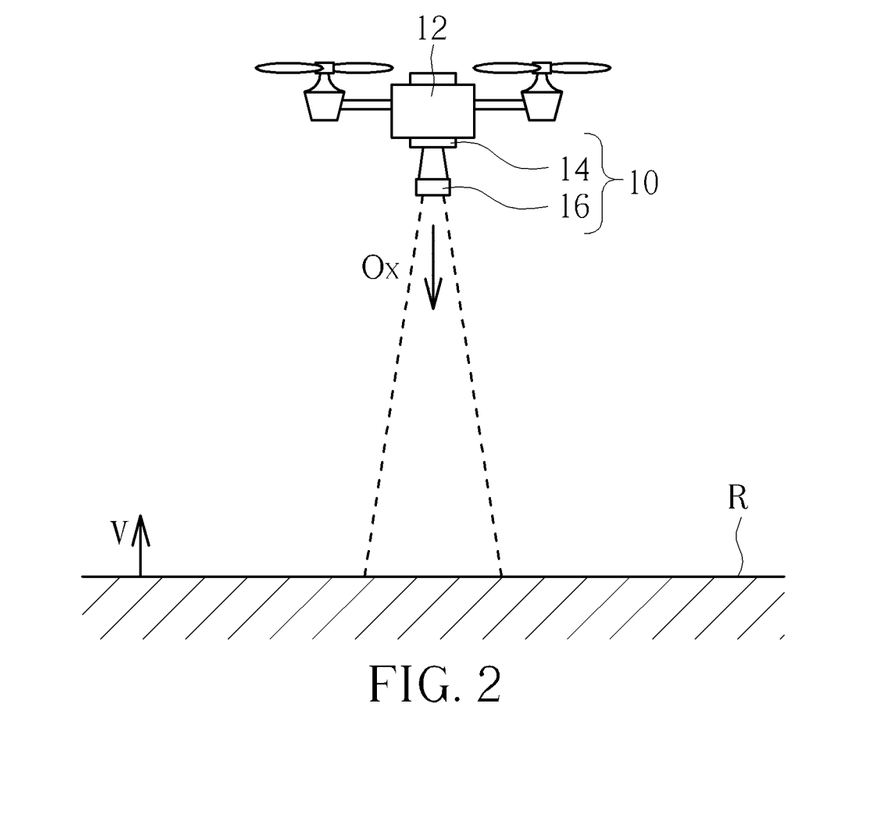
FIG. 2 and FIG. 3 respectively are schematic diagrams of a flight vehicle with the optical motion detecting device according to different embodiments of the present invention.
Figure 3:
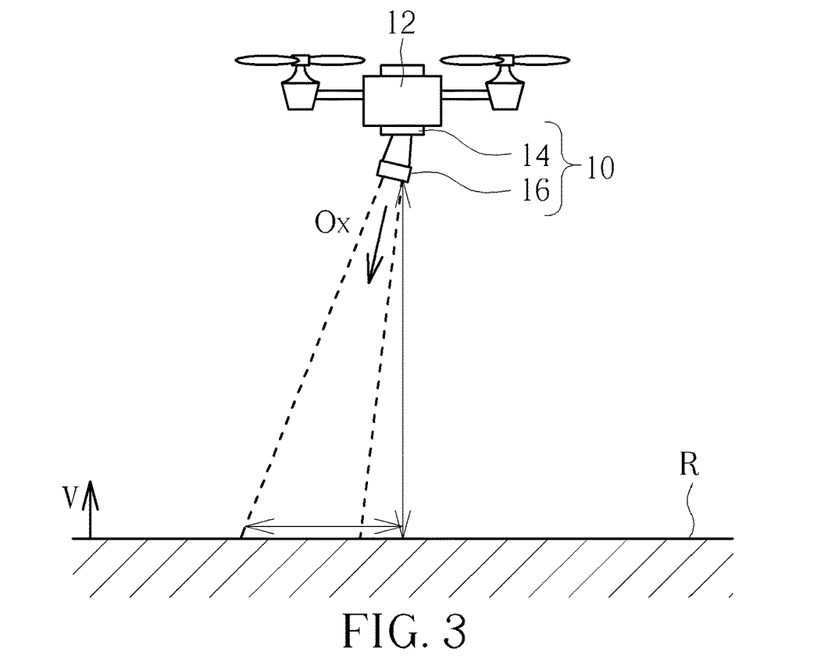

Please refer to FIG. 1 to FIG. 3. FIG. 1 is a block diagram of an optical motion detecting device 10 according to a first embodiment of the present invention. FIG. 2 and FIG. 3 respectively are schematic diagrams of a flight vehicle 12 with the optical motion detecting device 10 according to different embodiments of the present invention. The optical motion detecting device 10 can be assembled with the flight vehicle 12 and used to detect motion of the flight vehicle 12 without interference of environmental noise. The optical motion detecting device 10 can include a base 14, an optical motion sensor 16 and an operating processor 18. The base 14 is fixed to a bottom of the flight vehicle 12, the optical motion sensor 16 is disposed on the base 14 and adapted to capture a plurality of frames about a reference plane R, and the operating processor 18 is electrically connected with the optical motion sensor 16 to analyze a pattern within the plurality of frames when the flight vehicle 12 makes a flight.

The optical motion sensor 16 faces toward the reference plane R to capture the frames, and the pattern within the frames can be represented as any object stays or moves on the reference plane R. The operating processor 18 analyzes a movement of the pattern and transforms the movement into displacement of the base 14 relative to the reference plane R according to a known height value. It should be mentioned that the known height value represents a height where the flight vehicle 12 starts to move; for example, the flight vehicle 12 may be lifted from the ground or from a platform, the known height value equals zero when the flight vehicle 12 may be lifted from the ground, and the known height value equals a height of the platform. The known height value can be detected by an external height sensor (such as the barometer, the sonar sensor or the Time of Flight sensor) of the flight vehicle 12. Further, the known height value can be assumed via a predetermined takeoff mode of the flight vehicle 12; for example, the flight vehicle 12 lifted from the ground is set in the first takeoff mode, and lifted from the platform is set in the second takeoff mode, therefore the known height value can be received according to the takeoff mode of the flight vehicle 12.

In the present invention, a count number is generated while the pattern within the frames is moved over one or more pixel units, an amount of the passed pixel units is equal to the count number of the optical motion detecting device 10, and the movement of the pattern can be defined as a value of accumulated counts. When the flight vehicle 12 is levelly flown across a specific distance, the flight vehicle 12 in a higher position provides the tiny movement of the pattern, the flight vehicle 12 in a lower position provides the obvious movement of the pattern, the count number of the optical motion detecting device 10 assembled with the flight vehicle 12 staying in the higher position is less than the count number of the optical motion detecting device 10 assembled with the flight vehicle 12 staying in the lower position, and level displacement of the flight vehicle 12 can be acquired accordingly. When the flight vehicle 12 is flown vertically to lift or descend, the pattern within the frames may be deformed when the optical motion sensor 16 is a wide angle lens, deformation of the pattern is unapparent when the optical motion sensor 16 is a narrow angle lens and variation between lifting height and the deformation is non-linear.

In addition to the foresaid deformation, the pattern within the frames can be gradually reduced when the flight vehicle 12 is lifted and the optical motion detecting device 10 is moved from the lower to the higher position, and further can be gradually enlarged when the flight vehicle 12 is descended and the optical motion detecting device 10 is moved from the higher to the lower position. Variation between the lifting/descending height and the size reduction/enlargement is non-linear. The optical motion detecting device 10 can store the foresaid variation into database to establish a curve or table lookup about relation between the accumulated counts and the lifting height, and then can rapidly acquire the lifting height of the flight vehicle 12 by the curve or the table lookup in an interpolation manner, so as to acquire vertical displacement of the flight vehicle 12.

As the embodiment shown in FIG. 2, an optical axis Ox of the optical motion sensor 16 can be parallel to a planar normal vector V of the reference plane R. When the flight vehicle 12 is flown in an approximately horizontal line or surface and the known height value is constant, the optical motion detecting device 10 can transform the accumulated counts into the level displacement of the flight vehicle 12 by computation or the curve/table lookup. When the flight vehicle 12 is vertically flown without the level displacement, the optical motion detecting device 10 can acquire the vertical displacement of the flight vehicle 12 by the computation or the curve/table lookup. The acquired vertical displacement may be used to compare with the known height value detected by the external height sensor or assumed by the predetermined takeoff mode for amendment and compensation.

As the embodiment shown in FIG. 3, the optical axis Ox of the optical motion sensor 16 can be slanted to form a fixed angle between the optical axis Ox and the planar normal vector V of the reference plane R, the optical motion sensor 16 with the fixed angle can be used to acquire the level displacement and the vertical displacement of the flight vehicle 12 via the same manner as the embodiment shown in FIG. 2. When the flight vehicle 12 is flown in the approximately horizontal line or surface and the known height value is constant, the optical motion detecting device 10 transforms the accumulated counts into the level displacement of the flight vehicle 12 by the computation or the curve/table lookup. When the flight vehicle 12 is vertically flown without the level displacement, the accumulated counts are varied in the non-linear manner and can be transformed into the lift displacement of the flight vehicle 12 by the computation or the curve/table lookup.

Further, when flight vehicle 12 is vertically flown from the lower position to the higher position, a projection area onto the reference plane R is moved from center to the distant place, a moving speed of the projection area is gradually decreased, and the count number per meter (or any other units of measurement) is accordingly decreased in the non-linear manner. Relation between the CPM (count number per meter) and a level distance (a shift quantity of the projection area) is established and stored into the database. As the flight vehicle 12 is vertically flown without the level displacement, the CPM is detected, the fixed angle is a known parameter, the level distance is sought by the curve or the table lookup, and the vertical displacement of the flight vehicle 12 can be acquired via trigonometric computation. The computed vertical displacement is used to amend and compensate the external height sensor of the flight vehicle 12 in an auxiliary way.

When the known height value detect by the external height sensor is constant and the movement of the pattern detect by the optical motion sensor 16 is unidirectional, the flight vehicle 12 can be determined as hovering on the specific horizontal line or surface, the accumulated counts can be transformed into a hovering angle of the flight vehicle 12, and the hovering angle can be defined as a compensating signal. If an inertial measurement unit (such like the accelerometer or the gyroscope) of the flight vehicle 12 does not detect any motion, the optical motion detecting device 10 can transmit the compensating signal to the flight vehicle 12 for amendment and compensation. Besides, when the flight vehicle 12 is flown levelly in a constant speed and the CPM (or the count number per inch or per time unit) is gradually varied, the optical motion detecting device 10 can determine that the flight vehicle 12 may move across a ramp. For example, when the flight vehicle 12 moves toward the uphill ramp, the optical motion detecting device 10 can detect increase of the CPM and transmit a warning signal to the flight vehicle 12; when the flight vehicle 12 moves backward the downhill ramp, the optical motion detecting device 10 can detect decrease of the CPM and send a notice to the flight vehicle 12.

Figure 4:
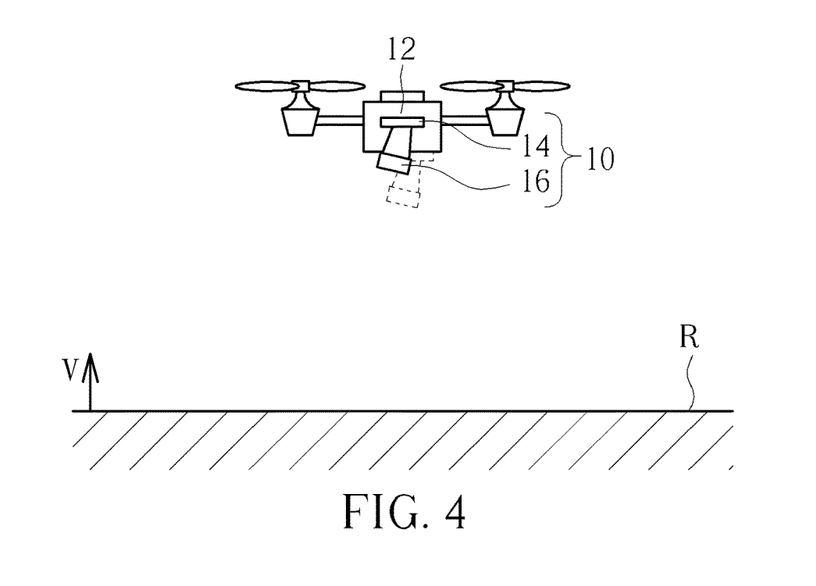
FIG. 4 is a diagram of the flight vehicle with the movable optical motion detecting device according to an embodiment of the present invention.

Please refer to FIG. 4. FIG. 4 is a diagram of the flight vehicle 12 with the movable optical motion detecting device 10 according to an embodiment of the present invention. The optical motion sensor 16 of the movable optical motion detecting device 10 can be moved relative to the base 14 between a first position and a second position, the first position is a lower position illustrated by the dotted line, the second position is a higher position illustrated by the solid line, and a vertical interval between the first position and the second position is a known parameter. When the flight vehicle 12 is stayed in the air, the optical motion sensor 16 can be moved between the first position and the second position for a start, to acquire the known height value without service of the external height sensor by the trigonometric computation, then the optical motion sensor 16 can be stayed at one of the first position and the second position to capture and analyze the plurality of the frames, and the level displacement and the lift displacement of the flight vehicle 12 can be acquired accordingly.

Figure 5:
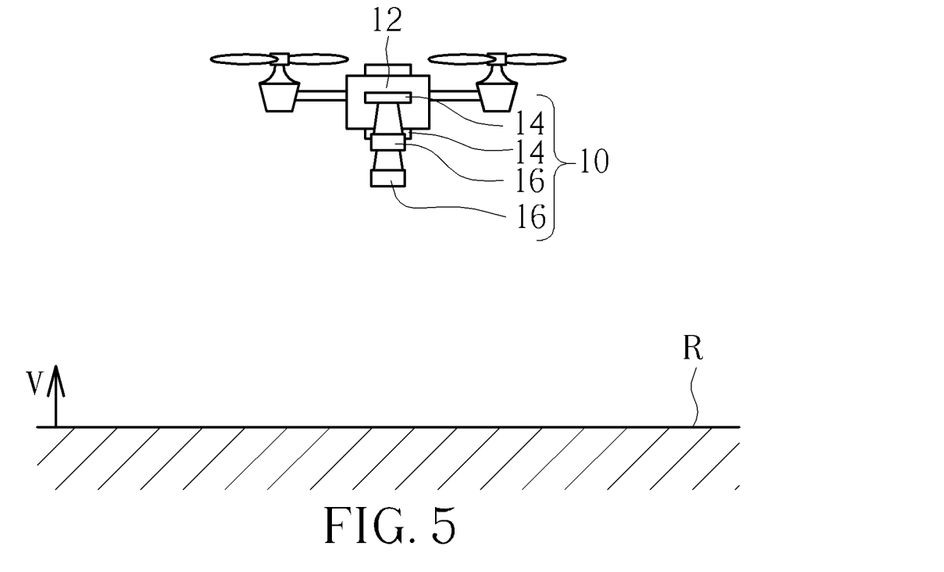
FIG. 5 is a diagram of the optical motion detecting device with two optical motion sensors mounted at different positions according to another embodiment of the present invention.

As the embodiment shown in FIG. 4, a view angle of the optical motion sensor 16 is a known parameter, the vertical interval between the first position and the second position is the known parameter, resolution of the optical motion sensor 16 at the first position and the second position can be respectively defined, and a ratio of the foresaid two resolution can be deduced according to relation of the view angle, the vertical interval and the resolution, and sensitivity of the said ratio can be controlled by changing the vertical interval. For the same reason, the optical motion detecting device may have two or more optical motion sensors mounted at different positions with the known vertical interval, or have two or more optical motion sensors with different known view angles that mounted at different known positions; height and the view angle of the optical motion sensors are known, related structural parameter difference of the optical motion sensors are computed accordingly, and the optical motion detecting device can provide the self-adaptive resolution function via the trigonometric computation. The flight vehicle 12 having the optical motion detecting device 10 with the optical motion sensors 16 mounted at different positions on the base 14 can be shown in FIG. 5, and the optical motion sensors 16 may have similar or dissimilar view angles.

Figure 6:
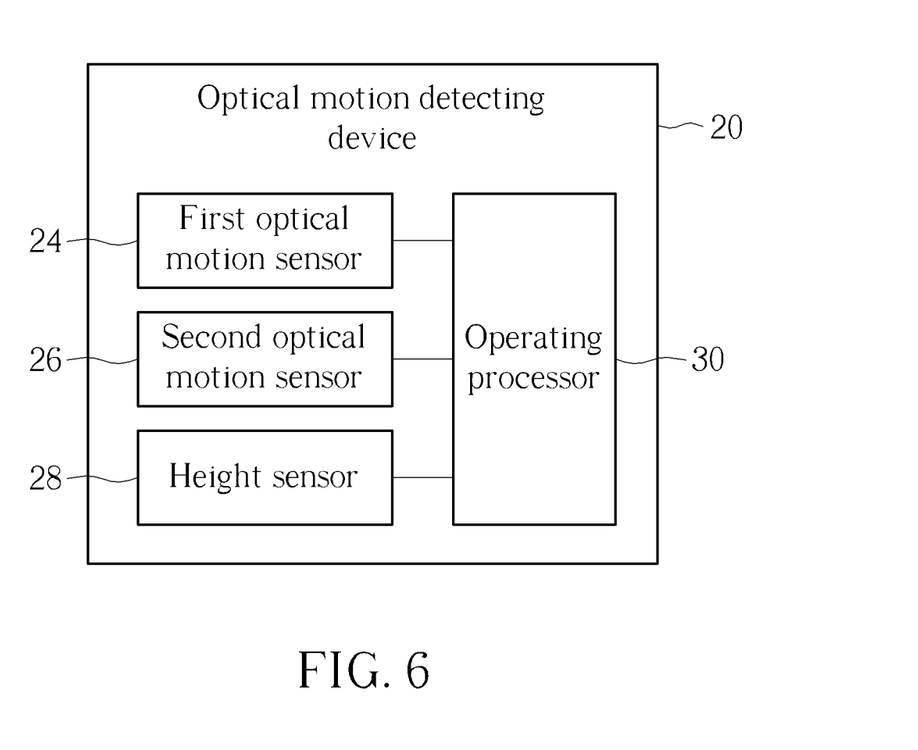
FIG. 6 is a block diagram of an optical motion detecting device according to a second embodiment of the present invention.

Please refer to FIG. 6 to FIG. 10. FIG. 6 is a block diagram of an optical motion detecting device 20 according to a second embodiment of the present invention. FIG. 7 to FIG. 10 respectively are schematic diagrams of the optical motion detecting device 20 in different applications according to second embodiment of the present invention. The optical motion detecting device 20 can be applied for the flight vehicle 12, and include a base 22, a first optical motion sensor 24, a second optical motion sensor 26, a height sensor 28 and an operating processor 30. The base 22 is fixed to the bottom of the flight vehicle 12. The first optical motion sensor 24 and the second optical motion sensor 26 are utilized to respectively capture a plurality of first frames and a plurality of second frames.

Structural parameters of the first optical motion sensor 24 and the second optical motion sensor 26 relative to the base 22 are different from each other; for example, the vertical interval between the first optical motion sensor 24 and the second optical motion sensor 26 can be known as the structural parameters, or the view angles of the first optical motion sensor 24 and the second optical motion sensor 26 are different and known as the structural parameters. The operating processor 30 is electrically connected with the first optical motion sensor 24, the second optical motion sensor 26 and the height sensor 28. The height sensor 28 is an optional element which is used to provide a height value calibrated by a detection result of the first optical motion sensor 24 and the second optical motion sensor 26. The operating processor 30 can analyze the patterns within the first frames and the second frames to acquire the level displacement and the lift displacement of the flight vehicle 12 relative to the reference plane R.

Figure 7:
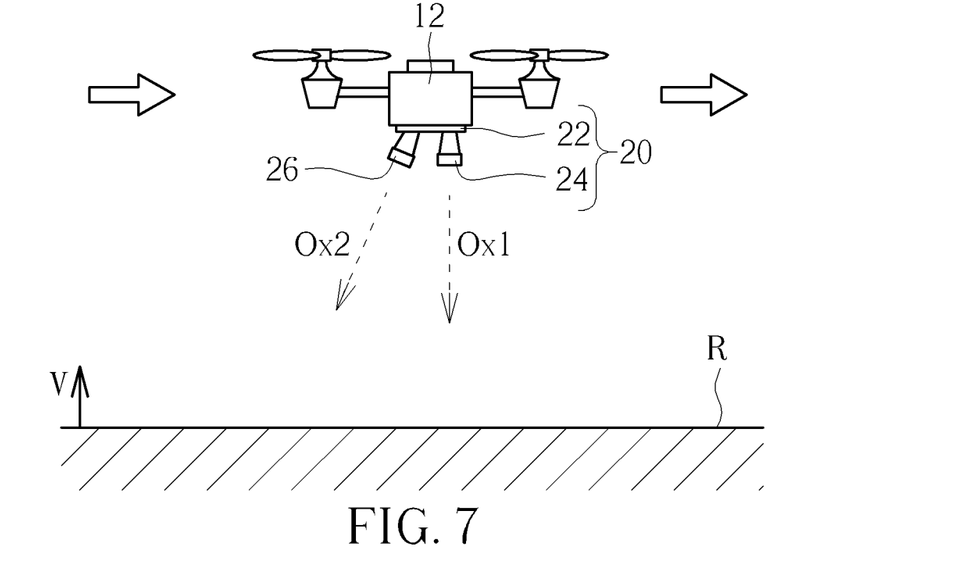
FIG. 7 to FIG. 10 respectively are schematic diagrams of the optical motion detecting device in different applications according to second embodiment of the present invention.
Figure 8:
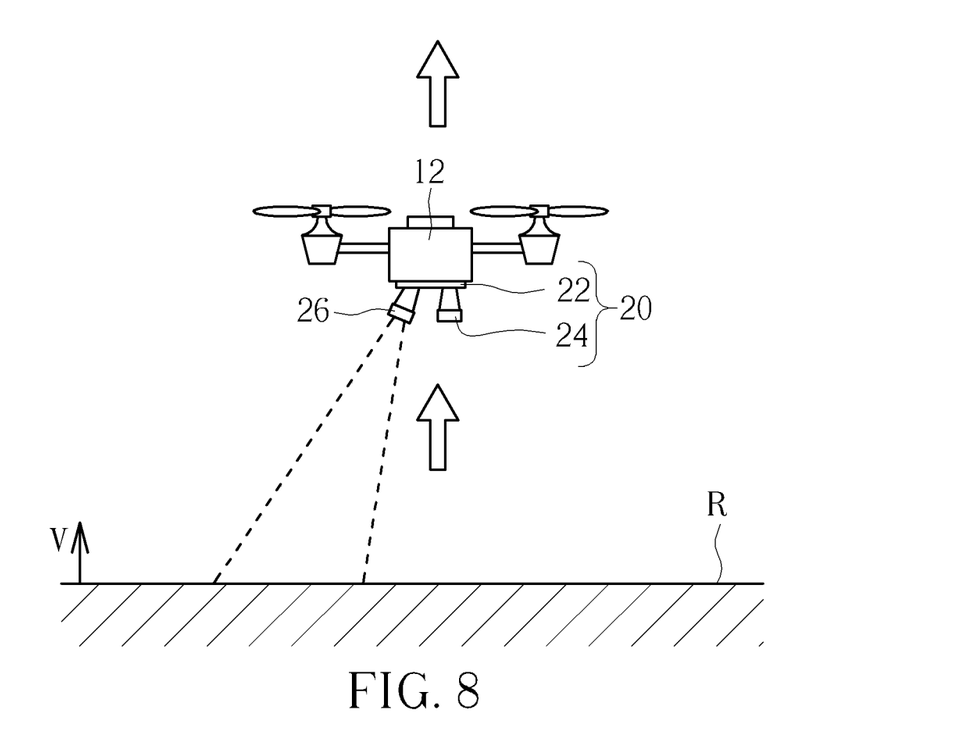

In the second embodiment, a first optical axis Ox1 of the first optical motion sensor 24 can be parallel to the planar normal vector V of the reference plane R, and a second optical axis Ox2 of the second optical motion sensor 26 can be slanted to form the fixed angle between the second optical axis Ox2 and the planar normal vector V. As shown in FIG. 7, the flight vehicle 12 is flown levelly without vertical motion, the accumulated counts can be transformed into the level displacement of the flight vehicle 12 because the movement of the pattern does not have size variation and can be linearly moved within the first frames or the second frames. As shown in FIG. 8, the flight vehicle 12 is flown vertically without level motion, the accumulated counts generated by the second optical motion sensor 26 is varied in the non-linear manner and can be transformed into the lift displacement of the flight vehicle 12 via the trigonometric computation and the curve/table lookup.

Figure 9:
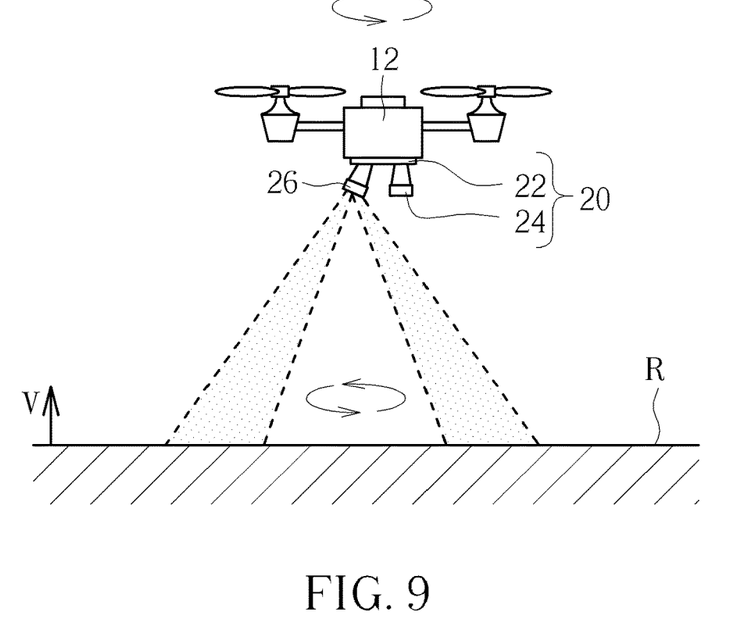
Figure 10:
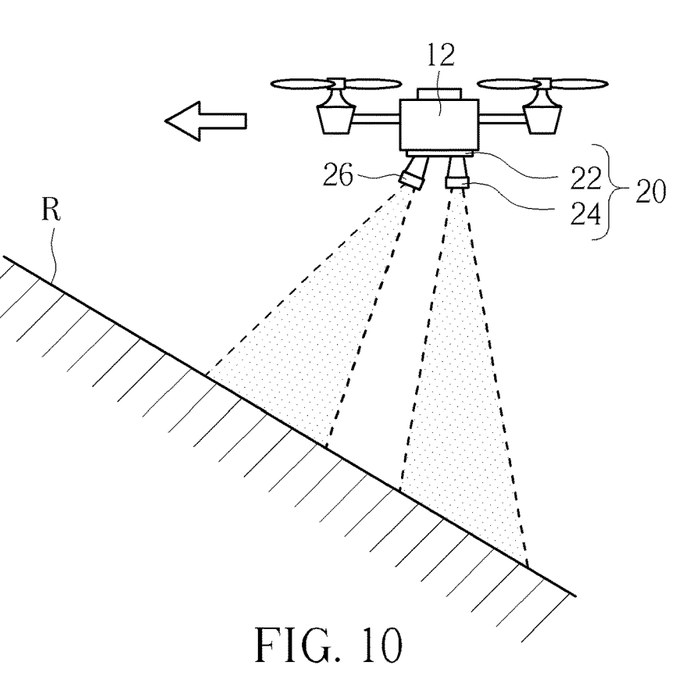

As shown in FIG. 9, when the optical motion detecting device 20 determines that the movement of the pattern within the first frames is unapparent and the movement of the pattern within the second frames is unidirectional, and simultaneously the inertial measurement unit of the flight vehicle 12 does not detect any motion, the optical motion detecting device 20 can transform the accumulated counts generated by the second optical motion sensor 26 into the hovering angle, and send the compensating signal corresponding to the hovering angle to the flight vehicle 12 for amendment and compensation. As shown in FIG. 10, when the flight vehicle 12 keeps the same flight power but movements of the patterns within the first frames and the second frames are varied simultaneously, the optical motion detecting device 20 can determine the flight vehicle 12 moves toward or backward the ramp according to increase and decrease of the CPM.

If the optical motion detecting device only has one optical motion sensor, the optical motion detecting device may easily misjudge the detection result and outputs an incorrect command to the flight vehicle 12. For example, the flight vehicle 12 is flown across a tree, the optical motion detecting device with the single optical motion sensor detects unexpected increase of the accumulated accounts, and the flight vehicle 12 may take a sudden lift to avoid the crash; in the case of the optical motion detecting device 20 having the first optical motion sensor 24 and the second optical motion sensor 26 with different optical axes, the optical motion detecting device 20 can determine the flight vehicle 12 is flown across the ramp when the two optical motion sensors show the same trend of varied accumulated accounts. When only one of the two optical motion sensors has varied accumulated accounts, the optical motion detecting device 20 can ascertain that the flight vehicle 12 is flown across the tree because the second optical motion sensor 26 should detect the tree earlier.

In another possible embodiment, the optical motion detecting device may have three optical motion sensors, an optical motion sensor faces downward, and other optical motion sensors which are mounted at the fixed known angle respectively face forward and backward. The optical motion detecting device of the present invention is preferably utilized to aid the external non-optical detection height sensor. The external non-optical detection height sensor is easily interfered by environmental audio/video noise, so the optical motion detecting device is applied for analyzing the movement of the pattern within the captured frame and being able to filter the noise and to acquire the accurate displacement of the flight vehicle. The level and vertical displacement detected by the optical motion detecting device can be compared with the detection result of the external non-optical detection height sensor, so as to determine the fly mode of the flight vehicle for preferred self-adaptation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical motion detecting device fora flight vehicle, the optical motion detecting device comprising:
   a base;
   an optical motion sensor disposed on the base and adapted to capture a plurality of frames; and
   an operating processor electrically connected with the optical motion sensor, the operating processor analyzing a pattern within the plurality of frames to acquire displacement of the base relative to a reference plane according to a known height value, wherein the known height value represents a height that the flight vehicle starts to move.

2. The optical motion detecting device of claim 1, wherein the known height value is detected by an external height sensor of the flight vehicle or assumed via a predetermined takeoff mode of the flight vehicle.

3. The optical motion detecting device of claim 1, wherein an optical axis of the optical motion sensor is slanted to form a fixed angle between the optical axis and a planar normal vector of the reference plane, or the optical axis is parallel to the planar normal vector.

4. The optical motion detecting device of claim 3, wherein the operating processor transforms a movement of the pattern within the frames into lift displacement of the base via the fixed angle while the known height value is varied.

5. The optical motion detecting device of claim 3, wherein the operating processor transforms a movement of the pattern within the frames into a hovering angle of the base via the fixed angle while the known height value is constant and the movement is unidirectional.

6. The optical motion detecting device of claim 5, wherein the operating processor transmits a compensating signal to the flight vehicle according to the hovering angle.

7. The optical motion detecting device of claim 3, wherein the operating processor determines that the base moves across a ramp while the flight vehicle is flown levelly in a constant speed and the known height value and a movement of the pattern within the frames are varied simultaneously.

8. The optical motion detecting device of claim 1, wherein the operating processor transforms a movement of the pattern within the frames into level displacement of the base while the known height value is constant.

9. The optical motion detecting device of claim 1, wherein the optical motion sensor is moved relative to the base from a first position to a second position to capture the plurality of frames, a vertical interval between the first position and the second position is represented as the known height value.

10. The optical motion detecting device of claim 1, wherein the pattern is analyzed to acquire the displacement of the base by count computation and/or table lookup.

11. An optical motion detecting device for a flight vehicle, the optical motion detecting device comprising:
    a base;
    a first optical motion sensor fixed on the base and adapted to capture a plurality of first frames;
    a second optical motion sensor fixed on the base and adapted to capture a plurality of second frames, structural parameters of the first optical motion sensor and the second optical motion sensor relative to the base being different from each other; and
    an operating processor electrically connected with the first optical motion sensor and the second optical motion sensor, the operating processor analyzing patterns within the first frames and the second frames to acquire displacement of the base relative to a reference plane.

12. The optical motion detecting device of claim 11, further comprising:
a height sensor electrically connected with the operating processor to provide a height value calibrated by the displacement.

13. The optical motion detecting device of claim 11, wherein a first optical axis of the first optical motion sensor is parallel to a planar normal vector of the reference plane, and a second optical axis of the second optical motion sensor is slanted to form a fixed angle between the second optical axis and the planar normal vector.

14. The optical motion detecting device of claim 13, wherein the operating processor transforms a movement of the pattern within the first frames or the second frames into level displacement of the base while the flight vehicle is flown levelly.

15. The optical motion detecting device of claim 14, wherein the operating processor transforms a movement of the pattern within the second frames into a hovering angle of the base via the fixed angle while the level displacement is invariable and the movement of the pattern within the second frames is unidirectional.

16. The optical motion detecting device of claim 15, wherein the operating processor transmits a compensating signal to the flight vehicle according to the hovering angle.

17. The optical motion detecting device of claim 13, wherein the operating processor transforms a movement of the pattern within the second frames into lift displacement of the base via the fixed angle while the flight vehicle is flown vertically.

18. The optical motion detecting device of claim 13, wherein the operating processor determines that the base moves across a ramp while movements of the patterns within the first frames and the second frames are varied simultaneously.

19. The optical motion detecting device of claim 11, wherein a vertical interval between the first optical motion sensor and the second optical motion sensor is known as the structural parameters.

20. The optical motion detecting device of claim 11, wherein view angles of the first optical motion sensor and the second optical motion sensor are different and known as the structural parameters.

21. The optical motion detecting device of claim 11, wherein the pattern is analyzed to acquire the displacement of the base by count computation and/or table lookup.

* * * * *